United States Patent [19]

Buchel et al.

[11] 3,920,681

[45] Nov. 18, 1975

[54] 1-ALKYLSULPHONYL-2-TRI-FLUOROMETHYL-BENZIMIDAZOLES

[75] Inventors: Karl-Heinz Buchel; Wilhelm Stendel, both of Wuppertal, Germany

[73] Assignee: Bayer Aktiengesellschaft, Germany

[22] Filed: Aug. 24, 1973

[21] Appl. No.: 391,142

[30] Foreign Application Priority Data
Aug. 31, 1972 Germany............................ 2242785

[52] U.S. Cl................................ 260/309.2; 424/273
[51] Int. Cl.² ..................................... C07D 235/10
[58] Field of Search................................ 260/309.2

[56] References Cited
UNITED STATES PATENTS
3,430,259  2/1969  Newbold et al.................. 260/309.2

Primary Examiner—Henry R. Jiles
Assistant Examiner—C. M. S. Jaisle

[57] ABSTRACT

1-Alkylsulphonyl-2-trifluoromethyl-benzimidazoles of the formula

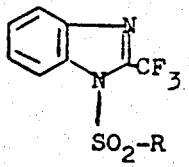

wherein R is alkyl of 1 to 4 carbon atoms are produced by reacting a 2-trifluoromethyl-benzimidazole of the formula

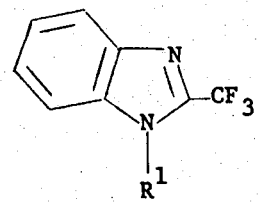

wherein $R^1$ is hydrogen or an equivalent amount of a cation with an alkylsulphonic acid halide of the formula

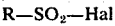

R—SO₂—Hal    III wherein R is as above defined and Hal is halogen, in the presence of an organic diluent which is inert to the reaction, at a temperature of from −10°C to +50°C.

The 1-alkylsulphonyl-2-trifluoromethyl-benzimidazoles are useful for their activity against ectoparasites.

7 Claims, No Drawings

3,920,681

1-ALKYLSULPHONYL-2-TRIFLUOROMETHYL-BENZIMIDAZOLES

The present invention is concerned with 1-alkyl-sulphonyl-2-trifluoromethyl-benzimidazoles, to a process for their production, to compositions embodying said compounds as the active ingredient and to their use as active agents against ectoparasites.

It is known in the art that O,O-diethyl-O-(3-chloro-4-methyl-umbelliferone)thiophosphate can be used against ectoparasites, especially as a tickicide (see U.S. Pat. No. 2,748,146). However, its activity in certain fields of use is no longer entirely satisfactory, for example because in one-host ticks of the genus Boophilus signs of resistance to phosphoric acid esters have occurred. Thus, the Biarra strain and the Mackay strain of *Boophilus microplus* in Australia show resistance to O,O-diethyl-O-(3-chloro-4-methyl-umbelliferone)thiophosphate. Furthermore, it is known that 1-methyl-sulphonyl-4,5,6-trichloro-2-trifluoromethyl-benzimidazole possesses an activity directed against insects which are harmful to plants, and against spider mites (compare Published Netherlands Application No. 66 10554). However, no special tickicidal activity of such compounds has been known.

The compounds of the present invention are 1-alkylsulphonyl-2-trifluoromethyl-benzimidazoles of the formula

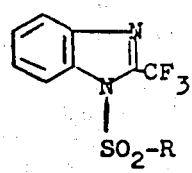

I wherein R is alkyl of 1 to 4 carbon atoms. These compounds may be produced by reacting a 2-trifluoromethyl-benzimidazole of the formula

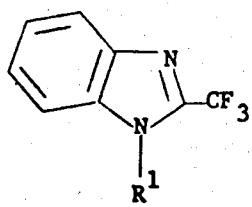

II wherein $R^1$ is hydrogen or an equivalent amount of a cation, with an alkylsulphonic acid halide of the formula R — SO$_2$ — Hal    III wherein R is as above defined and Hal is halogen, in the presence of an organic diluent which is inert to the reaction, at a temperature of from −10°C to +50°C. The reaction may, if desired, be carried out in the presence of an acid-binding agent.

The 1-alkylsulphonyl-2-trifluoromethyl-benzimidazoles of the present invention are useful as active agents against ectoparasites and are particularly useful for their strong acaricidal properties, especially against Acarina. The compounds of the present invention also exhibit activity against a species of the genus Acarina which attacks plants. The acaricidal activity of the 1-alkylsulphonyl-2-trifluoro-methyl-benzimidazoles of the present invention is substantially higher against resistant ticks than the known compound O,O-diethyl-O-(3-chloro-4-methyl-umbelliferone)thiophosphate.

If 2-trifluoromethyl-benzimidazole and methane-sulphonic acid chloride are used as starting substances, the course of the reaction can be represented by the following formula scheme:

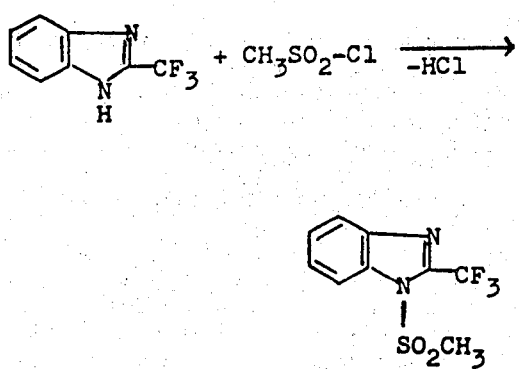

As set forth above, R is alkyl of 1 to 4 carbon atoms, which definition embraces both the straight as well as branched chain alkyl moieties, i.e., methyl, ethyl, n-propyl, isopropyl, n-butyl, sec.butyl and tert.butyl.

When $R^1$ is a cation, it is preferably the sodium cation.

Hal is preferably chlorine.

The alkylsulphonyl halides of the formula (III) which are used as starting materials for producing the compounds of the present invention, are known. Representative examples include: CH$_3$SO$_2$Cl, C$_2$H$_5$SO$_2$Cl and n-C$_3$H$_7$SO$_2$Cl. 2-trifluoromethylbenzimidazole which is used as a starting material to produce the compounds of the present invention is also known.

Diluents which can be used according to the process of the present invention include organic solvents which are inert toward this reaction. Preferred diluents include hydrocarbons such as benzene and toluene; ethers such as dioxan and tetrahydrofuran; nitriles such as acetonitrile, and ketones such as methyl ethyl ketone. It is also within the scope of the process of the present invention to use mixtures of these solvents.

With respect to the acid-binding agents, known acid-binding agents useful for processes of this type can be used in the present process. Preferred acid-binding agents include alkali metal hydroxides, alkali metal carbonates, alkali metal alcoholates, alkaline earth metal carbonates, tertiary organic bases and secondary organic bases. Sodium methylate, barium carbonate, pyridine and triethylamine are particularly useful.

While the temperature range for the reaction is preferably −10°C to +50°C, it is particularly preferred to carry out the reaction at a temperature of from about −10°C to about +20°C. The reaction is generally carried out at atmospheric pressure.

In carrying out the reaction according to the invention, 1 mol of alkylsulphonic acid chloride and 1 to 2 mols of acid-binding agent are generally employed per mol of 2-trifluoromethyl-benzimidazole of the formula (I).

The 1-alkylsulphonyl-2-trifluoromethyl-benzimidazoles of the present invention may be recovered either by a method in which the solvent is partially distilled off, the residue is taken up in methylene chloride or ether and the product which has been obtained is isolated therefrom by distilling off the solvent, and recrystallization, or by a method in which the halide which is sparingly soluble in organic solvents is filtered off, the solvent is partially distilled off and the precipitate is filtered off.

The following compounds are representative of those of the present invention:

1-methylsulphonyl-2-trifluoromethyl-benzimidazole
1-ethylsulphonyl-2-trifluoromethyl-benzimidazole
1-n-propylsulphonyl-2-trifluoromethyl-benzimidazole
1-iso-propylsulphonyl-2-trifluoromethyl-benzimidazole
1-n-butyl-sulphonyl-2-trifluoromethyl-benzimidazole; and
1-tert.-butylsulphonyl-2-trifluoromethyl-benzimidazole.

In addition to displaying strong acaricidal properties, especially against Acarina, which attack, as animal ectoparasites, domesticated animals such as cattle and sheep, the compounds of the present invention also exhibit a very low toxicity to warm-blooded animals, thus enhancing their veterinary use.

As examples of economically important ectoparasites of this nature which play a considerable role especially in tropical and sub-tropical countries there may be mentioned: the Australian and South American one-host cattle tick, *Boophilus microplus*, the South African cattle tick, *Boophilus decoloratus* (both from the family of the Ixodidae), as well as multi-host ticks such as species of Rhipicephalus, Amblyomma, Hyalomma and Ixodes.

Over the course of time, one-host ticks have in numerous areas become resistant against the phosphoric acid esters and carbamates hitherto used for combating them, so that in many places they have recently been combated with doubtful success. To secure economical raising of animals in places subject to attack, there is an urgent need for agents by means of which all stages of development, that is to say larvae, metalarvae, nymphs, metanymphs and adults, even of resistant strains, for example of the genus Boophilus, can be combated reliably. For example, in Australia the Mackay strain, the MT. Alfort strain and the Biarra strain of *Boophilus microplus* are highly resistant to the previous phosphoric acid ester agents.

The compounds of the present invention are effective both against the strains of normal sensitivity and against the resistant strains, for example of Boophilus. When administered in the usual manner to the host animal, they have a direct lethal effect on all parasitic forms so that the development cycle of the ticks is interrupted in the parasitic phase on the animal.

The production of fertile eggs and hence the development and hatching of larvae is inhibited.

According to the present invention, veterinary compositions are prepared which comprise a 1-alkyl-sulphonyl-2-trifluoromethyl-benzimidazole of the present invention in combination with a pharmaceutically acceptable non-toxic inert diluent or carrier. These veterinary compositions may be in the usual formulations, such as solutions, emulsions, suspensions, soluble, suspendable or emulsifiable concentrates, spraying or other powders, pastes, granulates and creams. These may be produced in known manner, for example by mixing the active compounds with extenders, that is, liquid or solid or liquefied gaseous diluents or carriers, optionally with the use of surface-active agents, that is, emulsifying agents and/or dispersing agents, and/or foam-forming agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids which would be gaseous at normal temperatures and pressures, e.g. aerosol propellants, such as halogenated hydrocarbons, e.g. freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying and foam-forming agents include non-ionic and anionic emulsifiers, such as polyoxyethylene-fatty acid esters, polyoxyethylene-fatty alcohol ethers, for example alkylarylpolyglycol ethers, alkyl sulphonates, alkyl sulphates and aryl sulphonates as well as albumin hydrolyzation products; and preferred examples of dispersing agents include lignin, sulphite waste liquors and methyl cellulose.

If desired, two or more compounds according to the present invention can be combined together with the pharmaceutically acceptable non-toxic inert diluent or carrier to form the veterinary compositions of the present invention.

The compounds of the present invention are generally present in the formulations in concentrations of 0.1 to 95 per cent by weight, preferably 0.5 to 90 per cent by weight. These may be diluted for actual application, and preparations intended for direct application generally contain the active compound according to the invention in concentrations of 0.001 to 5 per cent by weight, preferably 0.005 to 3 per cent by weight.

The compounds of the present invention are administered by topical application, such as spraying, dusting, rubbing or pouring, or by using a bath or dip in a conventional manner. The concentration and the absolute amount, in the mixture, of the particular active compound applied depends on the intended application and on the type of animal treated.

The following in vitro and in vivo test results illustrate the activity of the compounds of the present invention. The numbers associated with the compounds in the test data below correspond to the example numbers.

EXAMPLE A

In Vitro Tick Test on *Boophilus microplus*

3 parts of active compound were mixed with 7 parts of a mixture of equal parts by weight of ethyl glycol monomethyl ether and nonylphenol polyglycol ether. The emulsion concentrate thus obtained was diluted with water to the particular desired use concentration.

Adult fully engorged female ticks of the species *Boophilus microplus* (Biarra strain) were dipped for one minute into this active compound preparation. After groups of 25 female specimens had been dipped, the individual ticks were transferred into plastic dishes, the bottom of which was covered with a disc of filter paper.

After 35 days, the activity of the active compound preparation was determined by determining the inhibition of the production of fertile eggs as compared to the laying of eggs by untreated ticks. The activity is indicated in %, with 100% denoting that no fertile eggs were laid any longer and 0% denoting that the ticks laid eggs in the normal manner, like the untreated control ticks.

The results are given in Table A.

3 parts of active compound were mixed with 7 parts of a mixture of equal parts by weight of ethyl glycol monomethyl ether and nonylphenyl polyglycol ether. The emulsion concentrate thus obtained was diluted with water to the particular desired use concentration.

Cattle which had been infected repeatedly with resistant tick larvae of the species *Boophilus microplus*, Biarra strain (infection 12× at intervals of 2 days) were sprayed with the active compound preparation thus obtained.

The action of the active compound preparation was determined by determining the number of adult female ticks which developed on the treated cattle. This number was compared with the number of adult female ticks which developed on untreated cattle. A com-

TABLE A

| Active Compounds | In Vitro Test Active Compound concentration in ppm | Inhibition of Egg-production % (Boophilus microplus, Biarra strain) |
|---|---|---|
| 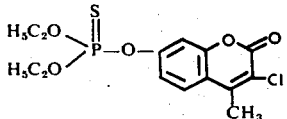 (known) | 10,000<br>3,000<br>1,000<br>300<br>100<br>30 | >50<br>>50<br>>50<br>>50<br>0<br>0 |
| 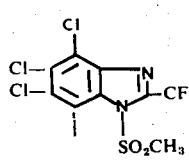 (known) | 10,000 | 0 |
| 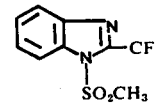 (1) | 10,000<br>100<br>1,000<br>300<br>100 | 100<br><br>100<br>100<br>0 |
| 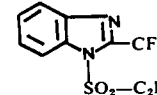 (2) | 10,000<br>3,000<br>1,000<br>300<br>100<br>30 | 100<br>100<br>100<br>100<br>100<br>0 |
| 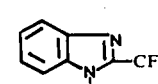 (3) | 10,000<br>3,000<br>1,000<br>300<br>100<br>30 | 100<br>100<br>100<br>>50<br><50<br>0 |

EXAMPLE B

In Vivo Tick Test on *Boophilus microplus* pound was the more active, the fewer female ticks developed after the treatment.

The number of adult females which developed in treated and untreated animals in the last three days before the point in time at which the treatment was carried out was used as a measure of the intensity of the infection before the treatment.

The active compounds and results of the test experiments can be seen from Table B.

The following non-limitative examples more particularly illustrate the present invention:

EXAMPLE 1

TABLE B

All stages of development in vivo (cattle) of *Boophilus microplus* (Biarra strain)

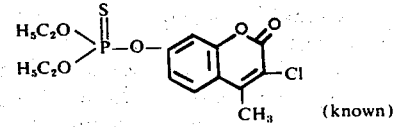 (known)

| Active Compound Concentration in ppm | Number of Ticks with Fertile Laid Eggs | | | | | | | | | | | | |
|---|---|---|---|---|---|---|---|---|---|---|---|---|---|
| | Days before treatment | | | Days after treatment | | | | | | | | | |
| | −2 | −1 | 0 | +1 | +2 | +3 | +4 | +5 | +6 | +7 | +8 | +9 | +10 |
| 2,000 | 482 | 377 | 397 | 236 | 112 | 9 | 14 | 0 | 0 | 12 | 24 | 34 | 16 |

| Active Compound Concentration in ppm | Number of Ticks with Fertile Laid Eggs | | | | | | | | | |
|---|---|---|---|---|---|---|---|---|---|---|
| | Days after treatment | | | | | | | | | Total in days +1 to +20 |
| | +11 | +12 | +13 | +14 | +15 | +16 | +17 | +18 | +19 | +20 | |
| 2,000 | 18 | 31 | 20 | 22 | 9 | 12 | 8 | 10 | 8 | 3 | 598 |

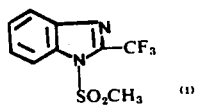 (1)

| Active Compound Concentration in ppm | Number of Ticks with Fertile Laid Eggs | | | | | | | | | | | | | | |
|---|---|---|---|---|---|---|---|---|---|---|---|---|---|---|---|
| | Days before treatment | | | | | | | Days after treatment | | | | | | | |
| | −2 | −1 | 0 | +1 | +2 | +3 | +4 | +5 | +6 | +7 | +8 | +9 | +10 | +11 | +12 |
| Untreated control | 110 | 148 | 181 | 262 | 86 | 114 | 68 | 152 | 158 | 131 | 70 | 25 | 9 | 18 | 47 |
| 500 | 312 | 373 | 625 | 8 | 4 | 0 | 1 | 6 | 2 | 7 | 17 | 9 | 7 | 2 | 2 |

| Active Compound Concentration in ppm | Number of Ticks with Fertile Laid Eggs | | | | | | | | |
|---|---|---|---|---|---|---|---|---|---|
| | Days after treatment | | | | | | | Total in days +1 to +20 | efficacy in |
| | +13 | +14 | +15 | +16 | +17 | +18 | +19 | +20 | | |
| Untreated control | 120 | 75 | 83 | 115 | 11 | 32 | 42 | 43 | 1661 | — |
| 500 | 0 | 2 | 0 | 0 | 0 | 0 | 0 | 0 | 67 | 97 |

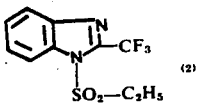 (2)

| Active Compound Concentration in ppm | Number of Ticks with Fertile Laid Eggs | | | | | | | | | | | | |
|---|---|---|---|---|---|---|---|---|---|---|---|---|---|
| | Days before treatment | | | | | | Days after treatment | | | | | | |
| | −2 | −1 | 0 | +1 | +2 | +3 | +4 | +5 | +6 | +7 | +8 | +9 | +10 |
| Untreated control | 608 | 1125 | 1038 | 395 | 386 | 236 | 52 | 22 | 137 | 224 | 173 | 131 | 119 |
| | 329 | 710 | 382 | 268 | 451 | 114 | 19 | 45 | 318 | 443 | 120 | 174 | 100 |
| 1,000 | 445 | 723 | 337 | 0 | 0 | 0 | 0 | 1 | 0 | 0 | 0 | 0 | 0 |
| 500 | 67 | 70 | 89 | 0 | 0 | 0 | 0 | 0 | 1 | 0 | 0 | 0 | 0 |

| Active Compound Concentration in ppm | Number of Ticks with Fertile Laid Eggs | | | | | | |
|---|---|---|---|---|---|---|---|
| | Days after treatment | | | | | Total in days +1 to +15 | Efficacy in % |
| | +11 | +12 | +13 | +14 | +15 | | |
| Untreated control | 98 | 194 | 128 | 77 | 154 | 2526 | — |
| | 247 | 296 | 107 | 75 | 168 | 2945 | — |
| 1,000 | 0 | 0 | 0 | 0 | 0 | 1 | 99.8 |
| 500 | 0 | 0 | 0 | 0 | 0 | 1 | 99.8 |

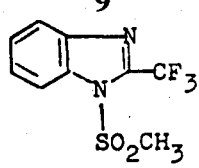

93 g (0.5 mol) of 2-trifluoromethyl-benzimidazole were added, while stirring, to a freshly prepared sodium methylate solution (11.5 g of sodium were dissolved, for this purpose, in approximately 200 ml of anhydrous methanol). The solution was mixed with approximately 500 ml of anhydrous benzene and a mixture of benzene and methanol were distilled off, while stirring, until the boiling point of pure benzene (80°C) was reached, if necessary with repeated addition of benzene. The suspension, which thus remained, of sodium salt in approximately 200 ml of benzene, was mixed with 300 ml of anhydrous acetonitrile; a solution resulted. The solution was cooled to 0°C and a solution of 57.3 g (0.5 mol) of methanesulphonic acid chloride in approximately 100 ml of anhydrous acetonitrile was added dropwise while stirring. Thereafter the resulting suspension was stirred for 3 hours at room temperature and then warmed under reflux for 1 hour.

The resulting sodium chloride was filtered off and the solvent of the filtrate was partly distilled off. The resulting precipitate was filtered off and recrystallized from ether. 81 g (61% of theory) of 1-methylsulphonyl-2-trifluoromethyl-benzimidazole of melting point 116° – 118°C were obtained.

EXAMPLES 2 – 6

The compounds set forth in the table below were prepared by reacting 2-trifluoromethyl-benzimidazole with the sulphonic acid chloride specified below:

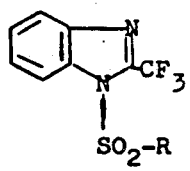

| Example | Sulphonic Acid Chloride | Compound of Formula (I) | Physical constants |
|---|---|---|---|
| 2 | ethanesulphonic acid chloride | R=$C_2H_5$ | m.p. 52–55°C |
| 3 | n-propylenesulphonic acid chloride | R=$C_3H_7$-n | b.p. 118–121°C 0,3 mm Hg |
| 4 | isopropylenesulphonic acid chloride | R=$CH(CH_3)_2$ | b.p. 117–121°C 0,4 mm Hg |
| 5 | butanesulphonic acid chloride | R=$C_4H_9$ | b.p. 135–140°C 0,3 mm Hg |
| 6 | tert.butanesulphonic acid chloride | R=$C(CH_3)_3$ | b.p. 137–139°C 0,3 mm Hg |

What we claim is
1. A compound of the formula

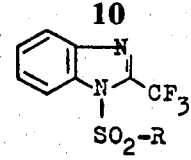

wherein R is alkyl of 1 to 4 carbon atoms.

2. The compound according to claim 1 which is

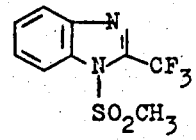

3. The compound according to claim 1 which is

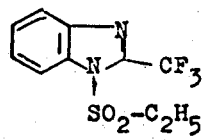

4. The compound according to claim 1 which is

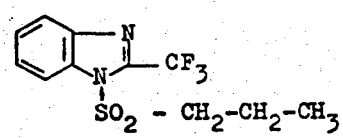

5. The compound according to claim 1 which is

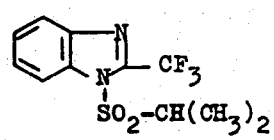

6. The compound according to claim 1 which is

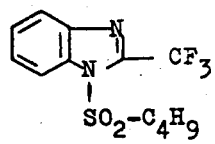

7. The compound according to claim 1 which is

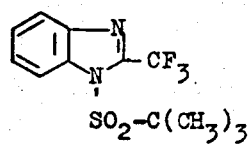

* * * * *